United States Patent [19]

Anderson

[11] 4,300,335
[45] Nov. 17, 1981

[54] HARVESTER ATTACHMENT
[75] Inventor: Sidney E. Anderson, Geneseo, Ill.
[73] Assignee: Deere & Company, Moline, Ill.
[21] Appl. No.: 170,371
[22] Filed: Jul. 21, 1980
[51] Int. Cl.³ ............................................. A01D 45/02
[52] U.S. Cl. ................................................... 56/119
[58] Field of Search ...................... 56/119, 2, 5, 14.2, 56/14.3, 14.5, 98

[56] References Cited
U.S. PATENT DOCUMENTS
4,037,393  7/1977  Anderson ............................ 56/119

Primary Examiner—Jay N. Eskovitz

[57] ABSTRACT

A multi-row corn head has a plurality of forwardly extending dividers that move between adjacent rows of row-planted crops, and each divider includes a hood-like downwardly and forwardly inclined shield structure that tapers to a forward gathering point. A shield extension is removably mounted on each of the inner dividers adjacent to the point where the ears of corn are stripped from the stalks to prevent the loss of ears off the front of the machine. Each extension includes an upwardly extending rear wall that projects above the shield structure and a semi-frustro conical front panel extending forwardly from the rear wall and seating against the top of the shield structure, the forward end of the shield extension being connected to the shield structure by a pair of tabs extending into holes on the top of the shield structure, while the rear end of the extension is locked to the shield structure by spring-loaded latches, which can easily be manipulated to permit the removal of the shield extensions from the shield structures when dictated by the crop conditions.

8 Claims, 4 Drawing Figures

HARVESTER ATTACHMENT

BACKGROUND OF THE INVENTION

This invention relates to a corn harvester that is used for removing corn ears from row-planted stalks, and more particularly to an improved attachment for such a harvester to prevent the loss of corn ears from the machine during the harvesting operation.

A corn harvesting machine such as a corn head, which is mounted on the front end of a combine, or a corn picker that is either mounted on or towed by tractor, conveniently includes a plurality of laterally spaced forwardly extending gathering members or dividers that ride between the rows as the machine advances to direct the stalks of the crops into fore and aft passages between the adjacent dividers. The dividers conventionally include hood-like shield structures that are inclined downwardly and forwardly and taper to a forward gathering point that is normally positioned between the adjacent rows.

It is known to provide removable shield extensions that extend upwardly from the shield structures on at least the inner dividers adjacent to and slightly forwardly of the point in the passageway between the dividers where the ear of corn is stripped from the stalk, so that the ears of corn that fall on top of the shield structure do not fall out the front of the machine, the extensions deflecting the crop laterally to the conveying mechanisms along the passages, which then convey the ears rearwardly into the machine. While the shield extensions are desirable when the crop is standing upright, when the crop is down and tangled the stalks are divided and raised by the dividers or gathering members, the stalks sliding rearwardly along top of the divider shield structures. In such a case, the shield extensions, which extend upwardly from the shield structures, can interfere with the rearward and upward movement of the stalks along the top of the shield structure, and in such conditions, it is desirable to remove the shield extensions. While on present commercially available corn heads, the shield extensions have been removable, the removal has been relatively laborious and time-consuming, so that the harvesting machine operator tends to leave the extensions on or off, as the case may be, even though the machine is not conditioned for optimum performance in the particular crop condition.

To overcome the problem, an easily removable shield extension was proposed by the inventor herein, the earlier design of the shield extension being disclosed in U.S. Pat. No. 4,037,393, which is also assigned to the assignee herein. However, the shield extension shown in said patent proved to be too complicated and costly for provision on production machines.

SUMMARY OF THE INVENTION

According to the present invention, there is provided a shield extension that is both simple to install and remove and is also relatively inexpensive.

More specifically, the improved shield extension features a simple sheet metal construction, with removal being accomplished by simply unlatching a pair of spring-loaded latches and swinging the extension upwardly away from the shield structure on which it is mounted. Remounting of the shield extensions can also be easily accomplished without special tools, by simply inserting tabs at the front end of the extensions in the proper holes in the shield structure and swinging the extension downwardly until the latch elements at the rear of the shield extensions engage. An important feature of the invention resides in the simple and rugged construction of the shield extension and is the fact that removal and mounting of the extensions can be quickly accomplished in the field, without special tools.

DESCRIPTION OF THE PREFERRED EMBODIMENT

Figure 1:
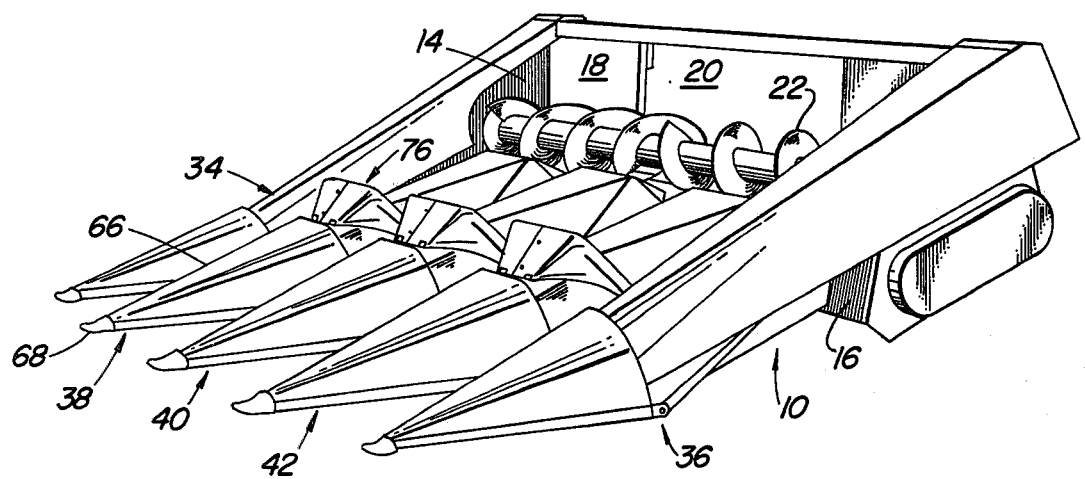
FIG. 1 is a perspective view of a corn head with the shield extensions embodying the invention mounted on the inner dividers.
Figure 2:
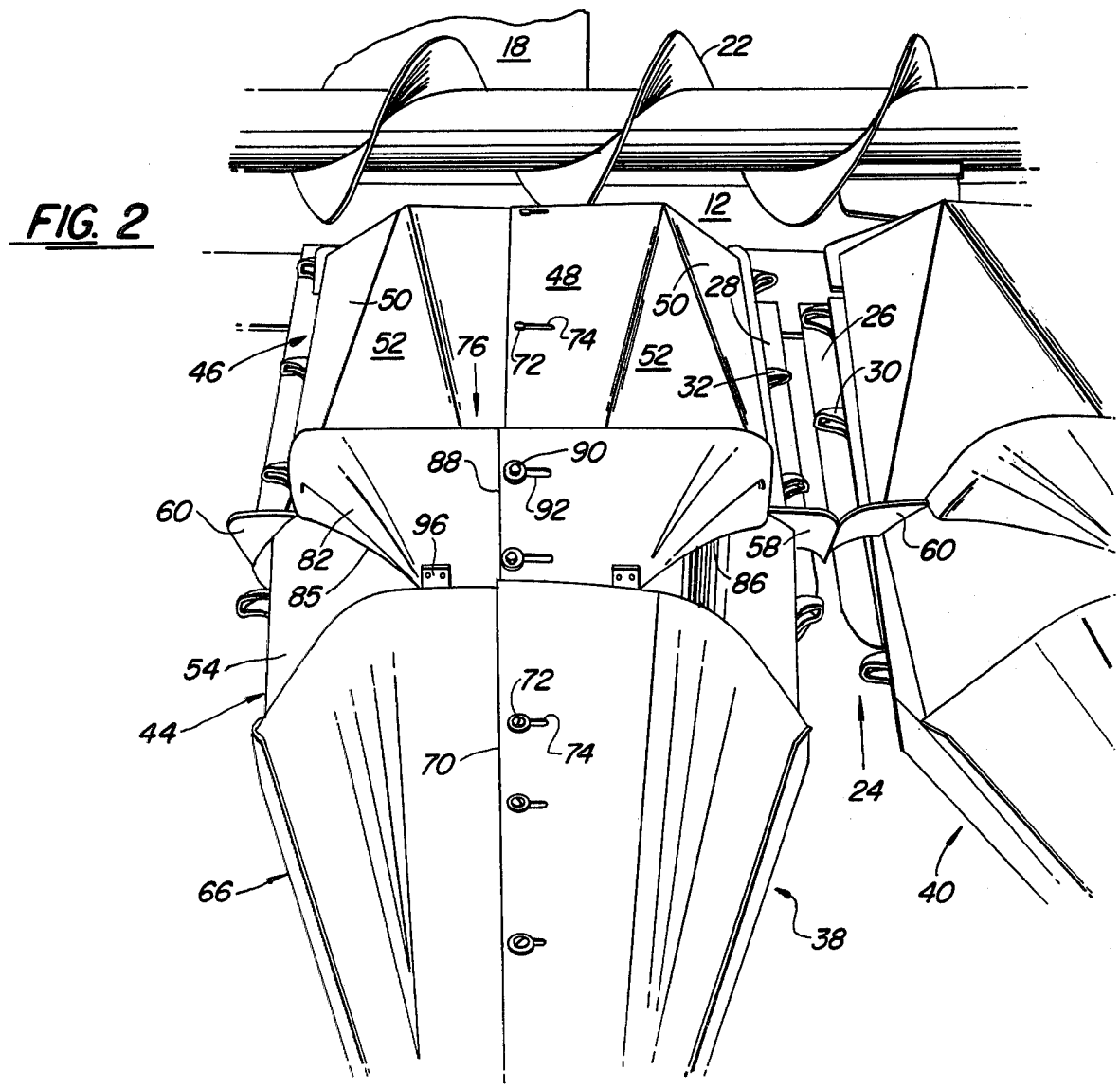
FIG. 2 is a top front perspective view of one of the dividers with the shield extension mounted thereon.
Figure 3:
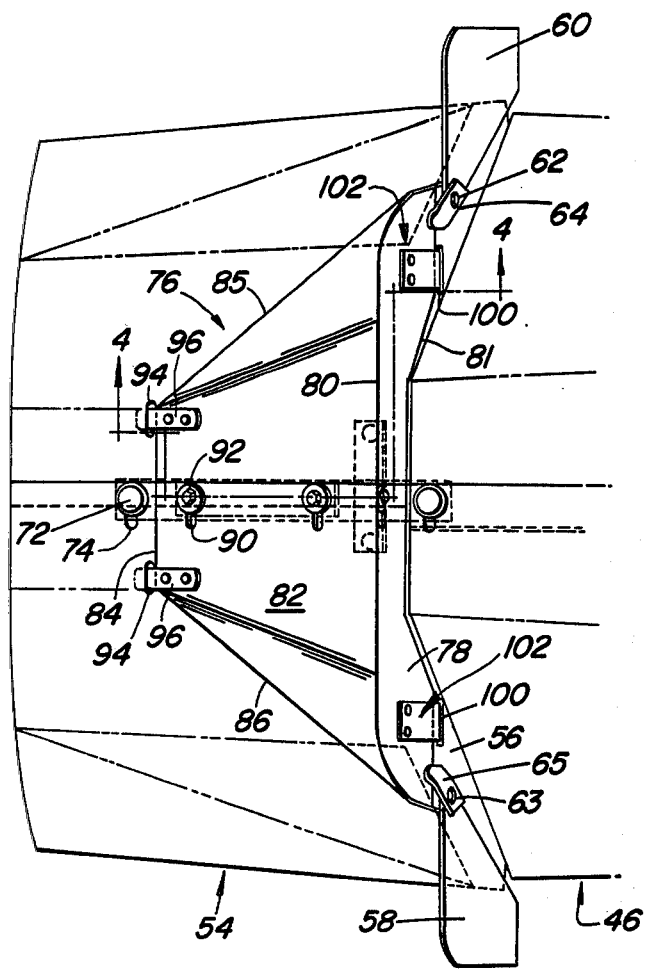
FIG. 3 is a top plan view of the central portion of a divider with the shield extension mounted thereon.
Figure 4:
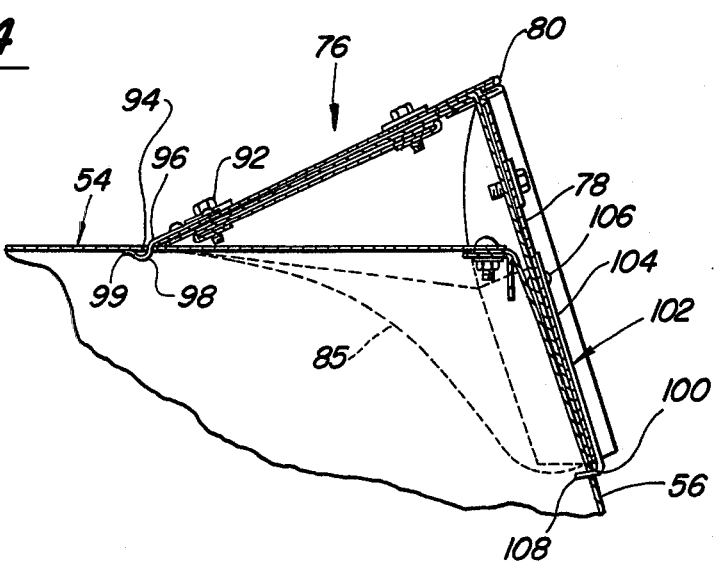
FIG. 4 is a vertical fore and aft section of the shield extension along the lines 4—4 of FIG. 3.

The invention is embodied in a corn head 10 that is conventionally attached to the front end of a combine feeder house, the corn head removing ears of corn from a standing corn crop and delivering the ears to the combine feeder house inlet. The corn head 10 includes a generally horizontal floor 12 extending between right and left sides 14 and 16 respectively. The corn head also has an upright rear wall 18 extending between the opposite sides and having a discharge opening 20 that registers with the inlet of the combine feeder house. A crop converging auger 22 extends between the opposite sides and converges crop material toward the center of the machine where it is discharged rearwardly through the opening 20.

A plurality of row units, indicated generally by the numeral 24, are mounted on the corn head frame and extend forwardly from the forward end of the floor 12. The construction and mounting of the row units is described in greater detail in U.S. Pat. No. 3,589,110, which is also assigned to the assignee herein. Each row unit includes a pair of forwardly extending deck plates 26 and 28 that are laterally spaced to form a fore and after passage that receives the stalk of the corn plant as the machine advances. As is well known, the stalk of the plant is engaged between a pair of counter-rotating fore and aft stalk rolls located below the deck plates, the stalk rolls pulling the stalk downwardly as the stalk moves rearwardly along the passage so that the ear of corn engages the deck plates and is stripped from the stalk thereby, the spacing between the deck plates being sufficient to permit the passage of the stalk but not the passage of an ear of corn. Each row unit includes a pair of gathering chains 30 and 32 having opposite rearwardly moving inner run above the deck plates 26 and 28 on opposite sides of the passage, the lugs on the gathering chains engaging the separated corn ears and moving them rearwardly to the corn head floor 12, where they are converged and discharged by the auger 22.

The illustrated corn head is a four-row machine adapted to harvest four rows at a time, so that four separate row units 24 are provided. Right and left outer dividers 34 and 36 extend forwardly from the right and left corn head sides 14 and 16 respectively, the outer dividers partially covering the outer portions of the outer two row units 24. Inner dividers or gathering members 38, 40 and 42 span the gap between the adjacent row units and extend forwardly therefrom so that they ride between the adjacent rows as the machine advances. The dividers are spaced from one another so that they form fore and aft passages that are respectively aligned with the fore and aft passages or spaces between the row unit deck plates 26 and 28, the rear portions of the dividers overlying and shielding most of the respective row units. The inner dividers 38, 40 and 42 are identical in construction so that only the divider 38 will be shown and described in detail.

The divider 38 includes suitable framing, not shown, and is mostly formed by a hood-like shield structure, indicated in its entirety by the numeral 44. The shield structure 44 includes a generally inverted U-shaped rear portion 46 having a generally trapezoidal top panel 48 with its base at the rear of the shield structure adjacent the forward side of the auger 22. The rear portion also includes a pair of generally right triangular side panels 50 with a pair of triangular intermediate panels 52 extending between the top panel and the side panels with the apex of the triangular intermediate panels at the rear of the shield structure. As is apparent, the side panels 50 are inclined upwardly toward the center of the shield structure, and the lower edges of the side panel are immediately above the adjacent gathering chains of adjacent row units 24.

Immediately forward of the rear portion 46 of each of the shield structures 44, is an inverted U-shaped central portion 54, the central portion being slightly larger than the rear portion and including an upwardly and forwardly inclined riser wall 56 that spans the gap between the rear edge of the central portion 54 and the front of the rear portion 46. The riser wall 56 lies in a transverse upwardly and forwardly inclined plane, and the opposite edges of the wall are adjacent to the forward ends of the deck plates 26.

Mounted on and extending laterally from the opposite sides of the riser wall 56 are ear saver flaps 58 and 60. The flaps 58 and 60 are conventionally made of rubber or some other resilient material and extend approximately half way across the passage between the adjacent dividers, so that in conjunction with the flap on the adjacent divider, the flaps provide a flexible gate at the forward end of the passageway that permits the entrance of the corn stalk but tends to prevent the loss of separated corn ears out the forward end of the passageway. The ear saver flaps 58 and 60 are respectively removably attached to the riser wall 56 by fasteners 62 and 63. A pair of upwardly open clips 64 and 65 are also attached to the riser rear wall by the same fasteners 62 and 63. When operating in crop conditions where the stalks tnd to plug at the entrance to the passageway between the adjacent dividers, it is desirable to remove the ear saver flaps to lessen the possibility of plugging at that point, and the ear saver flaps are easily removable by simply moving the fasteners 62 and 63.

The shield structure 44 also includes a front portion or gathering point 66 that extends forwardly from the forward end of the central portion 54, the gathering point having a semi-conical shape that converges forwardly from the forward end of the central portion to a pointed tip 68 that normally rides between the crop rows close to the ground. The fore and aft center line of the shield structure extends through the tip 68 and the shield structure is generally symmetrical about the center line. A fore and aft seam is provided along the center line through the rear portion 46, the central portion 54 and the front portion or gathering point 66, so each of those portions are made of generally symmetrical halves that overlap to a limited degree along the seam 70. The halves of the shield structure portions are joined together by fastener 72 that extend through openings in the shield structure portions, at least one of the openings for each fastener being in the shape of a transversely elongated slot 74 that permits adjustment of the overall width of the shield structure to a limited degree. As is well known, the row units 24 are adjustable along the corn head frame to a limited degree to accommodate small variations in row spacings, and the adjustment in the overall width of the shield structures accommodates the different row spacings.

All of the above, with the exception of the mounting of the ear saver flaps, represents more or less known corn head construction, the invention being embodied in a shield extension 76 that is removably mounted on and extends upwardly from a central portion of each shield structure.

The shield extension includes a somewhat crescent-shaped rear wall 78 that overlaps and extends upwardly from the riser wall 56 generally coplanar therewith. The rear wall has a generally inverted U-shaped upper edge 80 and a concave inner edge 81 that conforms generally to the shape of the top of the front end of the shield structure rear portion 46.

The shield extension 76 also includes a front panel 82 that extends forwardly from the upper edge 80 of the rear wall, the front panel 82 having a generally semi-frustro conical shape that includes forwardly converging sides and a top or intermediate portion that inclines downwardly and forwardly to a transverse front edge 84 along the top of the central portion 54. The front panel sides have lower edges 85 and 86 that extend rearwardly and outwardly from the opposite ends of the front edge 84 to the opposite sides of the rear wall 78, front edges 85 and 86 being somewhat arcuate in shape and seating against the top of the central portion 54 of the shield structure.

Like the shield structure, the shield extension 76 has a fore and aft seam 88 along the center line of the divider so that the shield extension is made of generally symmetrical halves that overlap at the seam 88 and are clamped together by fasteners 90 extending through openings 92 in the respective halves, at least one of the openings being in the form of a laterally extending slot 92 that permits lateral adjustment of one half relative to the other so that the width of the shield extension 76 can be adjusted to conform to adjustment of the width of the shield structure 44.

A pair of laterally extending slot-like openings 94 are provided in the top of the central portion 54 immediately forward of and adjacent the opposite ends of the front edge 84 of the front panel 82, and a pair of tabs 96 are secured to the front panel 82 and extend forwardly from the front edge 84. The forward ends of the tabs 96 are provided with upwardly concave portions 98 that are insertible into the openings 94, the forward ends 99 of the tabs 96 being insertible through the openings 94 and engageable with the underside of the sheet metal central portion 54 adjacent the forward side of the openings 94.

The riser wall 56 is provided with a pair of laterally spaced, laterally extending slots 100 adjacent the lower edge of the extension rear wall 78 at the opposite sides of the extension. A pair of latch elements 102 in the form of a resilient metal straps or leafsprings are mounted on the shield extension rear wall 78. Each latch element includes a flat shank portion 104, having its upper end attached to the rear wall 78 by fasteners 106, and a hook portion 108 that extends forwardly from the lower end of the shank portion immediately below the rear wall 78, the hook portions having a width substantially the same as the width of the slots 100 and being insertible therethrough when the shield extension is mounted on top of the shield structure to lock the shield extension in position.

In operation, when the shield extension is mounted on the top of the shield structure, the forward ends of the tabs 96 extend through the openings 94 to lock the forward end of the shield extension onto the shield structure, while the hook portions 108 of the latch elements 102 extend into the openings 100 to lock the rear end of the shield extension to the shield structure. The clips 64 and 65 also overlap the lower end of the shield extension rear wall to resist rearward movement of the shield extension relative to the shield structure. While the latch elements 102 are resiliently bendable rearwardly so that the hook portions 108 clear the slots, the latch elements are sufficiently stiff to resist deflection to their unlocking position during operation of the machine.

To remove the shield extensions, a screwdriver or some similar pointed device is simply inserted between the shank portion 104 of each latch element 102 and the shield extension rear wall 78 to pry the hook portion 108 rearwardly from the opening 100. Once the hook portion 108 clears the opening, the shield extension can be swung upwardly and forwardly about its front edge 84. As is apparent, this movement will withdraw the rear wall 78 from behind the clips 64 and 65 and also result in the rotation of the hooked portions 98 of the tabs 96 to a position wherein they can be withdrawn vertically from the openings 94, at which time the entire extension can be lifted from the divider.

As described above, it is desirable to remove the shield extensions when operating in down and tangled crops to facilitate the rearward sliding movement of the down stalks along the top of the shield structure. However, in normal crop conditions, it is desirable to replace the shield extension 76, so that the rear wall 78 of the shield extension in conjunction with the flaps 58 and 60 prevent the loss of corn ears that have been snapped from their stalks, out the front of the machine. The shield extensions can easily be reinstalled by simply reinserting the tabs 96 in the openings 94 while the shield extension is in a vertical position, and then swinging the extension downwardly about the front edge 84 of the front panel so that the tab front ends 99 engage the underside of the central portion of the shield structure. The shield extension is swung downwardly until the hook portions 108 are aligned with the slots 100 in the riser wall and snap into the respective slots to again lock the shield extension in place. Since removal of the extension only requires a screwdriver or some other readily available tool and can be quickly accomplished, and remounting of the extensions can also be quickly accomplished without any tools at all, the machine operator is able to quickly adjust his machine for optimum performance in the particular crop condition encountered.

I claim:

1. In a multi-row crop harvester having a plurality of forwardly extending laterally spaced divider members adapted to move between rows of row planted crops and fore and aft crop receiving passages in the space between adjacent divider members, each inner divider member including a hood-like downwardly and forwardly inclined shield structure on top of the divider member, the shield structure including a generally semiconical forward portion converging to a forward point, a generally inverted U-shaped rear portion, a generally inverted U-shaped central portion between the forward and rear portion and a rearwardly facing riser wall extending between the central portion and the rearward portion, the combination therewith of improved shield extensions removably mounted on top of the shield structures, each shield extension comprising:

an upwardly and forwardly inclined rear wall extending upwardly from the riser wall and having a generally inverted U-shaped upper edge;

a front panel extending forwardly from the upper edge of the rear wall, and having a generally truncated semiconical shape with forwardly converging sides and a downwardly and forwardly inclined top portion, the lower, forward edges of the sides and the top portion seating against the top of the central portion of the shield structure with the fore and aft center line of the shield extension being vertically aligned with the fore and aft center line of the shield structure;

at least one tab element mounted on and extending forwardly from the lower front edge of the front panel;

at least one opening in the central portion of the shield structure adapted to receive the tab element when the shield extension is mounted on the shield structure;

a first pair of laterally spaced latch elements disposed on the riser wall on opposite sides of the shield structure center line;

and a second pair of latch elements respectively mounted on the shield extension rear wall and shiftable between locking positions wherein they engage the first pair of latch elements to lock the shield extension to the shield structure and unlocking position wherein they disengage the first pair of locking elements to permit the upward separation of the rearward and of the shield extension from the shield structure and the withdrawal of the tab element from the opening in the central portion of the shield structure.

2. The invention defined in claim 1 and including spring means biasing the second pair of latch elements toward their locking position.

3. The invention defined in claim 2 wherein the first pair of latch elements comprise a pair of openings in the riser wall and the second pair of latch elements include shank portions having one end mounted on the shield extension rear wall and hood portion on the free end of the shank portion and swingable into said openings when the shield extension is correctly seated on top of the shield.

4. The invention defined in claim 3 wherein the spring means is integral with the second pair of latch elements and is formed by resilient bending of the shank portions of the latch element.

5. The invention defined in claim 4 wherein a pair of openings are provided on top of the central portion of the shield structure on opposite sides of the fore and aft center line and a pair of laterally spaced tab elements are provided on the lower front edge of the front panel for respective insertion into said openings.

6. The invention defined in claim 5 wherein the tab elements have upwardly concave forward ends that are fully insertible into the openings only by rearward and downward swinging of the shield extension about its forward end after insertion of the forward tips of the tab elements into the openings, the tab elements engaging the central portion of the shield structure adjacent to the openings when the extension is seated on the shield structure to prevent any movement of the extension except upward swinging about its lower forward edge.

7. The invention defined in claim 6 wherein a pair of openings are provided on top of the central portion of the shield structure on opposite sides of the fore and aft center line and a pair of laterally spaced tab elements are provided on the lower front edge of the front panel for respective insertion into said openings.

8. The invention defined in claim 1 wherein the tab elements have upwardly concave forward ends that are fully insertible into the openings only by rearward and downward swinging of the shield extension abouts its forward end after insertion of the forward tips of the tab elements into the openings, the tab elements engaging the central portion of the shield structure adjacent to the openings when the extension is seated on the shield structure to prevent any movement of the extension except upward swinging about its lower forward edge.

* * * * *